(12) United States Patent
Walker

(10) Patent No.: US 6,703,091 B1
(45) Date of Patent: Mar. 9, 2004

(54) STRUCTURAL LINING SYSTEM FOR PIPES AND METHOD FOR APPLYING SAME

(76) Inventor: Roger H. Walker, 2519 S. Boston Pl., Tulsa, OK (US) 74114

( * ) Notice: Subject to any disclaimer, the term of this patent is extended or adjusted under 35 U.S.C. 154(b) by 0 days.

(21) Appl. No.: 10/085,723

(22) Filed: Feb. 28, 2002

Related U.S. Application Data

(63) Continuation-in-part of application No. 09/293,316, filed on Apr. 16, 1999, now abandoned.

(51) Int. Cl.[7] .................. F16L 55/163; F16L 9/133
(52) U.S. Cl. .................. 428/34.5; 428/37; 428/114; 428/294.1; 428/295.1; 428/295.4; 428/299.1; 442/354; 138/97; 138/98; 138/129; 138/144
(58) Field of Search .................. 428/34.5, 36.1, 428/37, 113, 114, 105, 294.1, 295.1, 295.4, 299.1; 442/354; 138/97–98, 129, 144

(56) References Cited

U.S. PATENT DOCUMENTS

| | | | | |
|---|---|---|---|---|
| 1,985,997 A | * | 1/1935 | Keeran | 156/187 |
| 3,616,123 A | * | 10/1971 | Reynolds et al. | 428/222 |
| 4,696,707 A | | 9/1987 | Lewis et al. | |
| 5,077,107 A | | 12/1991 | Kaneda et al. | |
| 5,114,697 A | * | 5/1992 | Naito et al. | 423/447.1 |
| 5,538,588 A | | 7/1996 | Martinez | |
| 5,677,046 A | | 10/1997 | Fawley et al. | |
| 5,924,262 A | | 7/1999 | Fawley | |

OTHER PUBLICATIONS

Roger H. Wakler & Charles W. Rowley Use of Structural Lining Systems—Apr. 19–23, 1999 Presented at the 7th International Conference on Nuclear Engineering, Tokyo, Japan.

* cited by examiner

*Primary Examiner*—William P. Watkins, III
*Assistant Examiner*—Sow-Fun Hon
(74) *Attorney, Agent, or Firm*—Molly D. McKay

(57) ABSTRACT

A structural lining system and a method of applying the system to the interior surface of a pipe. First, a layer of adhesive is sprayed onto the interior surface of a previously cleaned pipe. Next, strips of previously coiled unidirectional carbon fiber material are allowed to uncoil within the pipe so that side edges of the strips abut the side edges of adjacent strips and the junction where the ends of each strip come together are staggered around the pipe so that the junction for adjacent strips do not align longitudinally. If ends of the strips overlap, additional adhesive is applied between the overlapping portions. A final epoxy coating is sprayed over the strips, forming an internal liner for the pipe.

8 Claims, 3 Drawing Sheets

STRUCTURAL LINING SYSTEM FOR PIPES AND METHOD FOR APPLYING SAME

This application is a continuation-in-part of Ser. No. 09/293,316 filed on Apr. 16, 1999 now abandoned.

BACKGROUND OF THE INVENTION

1. Field of the Invention

The present invention relates to a system for structurally lining pipes, tanks or other cylindrical, oval or otherwise curve-shaped structures and a method for applying the structural lining to these structures. The application of this invention is not limited to pipes and tanks and not limited to cylindrical, oval or curve-shaped structures. Specifically, the invention is a method of securing a series of hoop-shaped strips of unidirectional carbon fiber material circumpherentially to an interior surface of a pipe so that sides of each strip abut the side of an adjacent strip. The unidirectional carbon fiber material is factory manufactured and cured with the carbon fibers oriented in a single direction. The strips are secured to the pipe by first applying an adhesive to the interior surface and then releasing a coiled strip so that it springs open to press itself against the interior surface. If ends of the strip overlap, additional adhesive is applied between the overlapping portions of the ends. A final coating of epoxy or other suitable coating may be applied to the strips to complete the installation.

When securing the strips to the interior surface of the pipe, it may be desirable to have one end of each strip overlap its opposite end and also to stagger the junctions formed by the ends of strips. The strips should be applied to the interior surface of the pipe so the end junctions of adjacent strips are staggered within the pipe, i.e. so that the end junctions of adjacent strips do not line up linearly along a longitudinal axis of the pipe.

2. Description of the Related Art

Pipes used in certain types of installations, such as for example a makeup water supply pipe to a nuclear power plant, are large in internal diameter, must withstand a certain amount of pressure, and must be dependable since failure of the pipe presents unacceptable risk.

For example a typical pipe might be constructed of a steel can embedded between an interior layer and an exterior layer of pre-stressed concrete and might have an internal diameter in the range of 8–12 feet.

These types of pipe experience significant regional problems where they are exposed to "hot soils". "Hot soils" are soils that are comprised of or contain specific corrosive components, such as acids, caustics, or salts, that can greatly accelerate the corrosion of pipe, attacking concrete, steel cans, reinforcing bars or wire. Unlike sewer pipes where the corrosion takes place from the inside out, in "hot soils" chlorides from the soil enter the concrete matrix of the pipe and attack then wire contained in the pre-stressed concrete. This may have been accelerated due to the lack of or improper application of cathodic protection.

As steel oxidizes, it expands, creating pressures that further open and widen cracks in the external layer of concrete and accelerate the deterioration of this layer of the pipe. Eventually the can begins to corrode and pinholes develop. The pinholes permit water to travel through the inner concrete line, through the pinholes and out the pipe via the deteriorated external layer. Once this occurs, it only takes a very short time, possibly only weeks or months, until the pipe is weakened to the point of permitting a rupture.

Current methods for addressing this problem include (1 replacement of the entire pipe, (2 installing a slip lining within the pipe, (3 inserting a cured-in-place pipe, also referred to as a CIPP lining or (4 lining the pipe with carbon cloth. A more complete discussion of these current methods is contained in a paper entitled "*Use of Structural Lining Systems*" published in the papers of the 7$^{th}$ International Conference on Nuclear Engineering held in Tokyo, Japan on Apr. 19–23, 1999 and sponsored by the American Society of Mechanical Engineers, et.al.

Replacing large pipes is slow, costly and unless different materials are used, the problem is destined to reoccur. The cost to install a replacement pipes is generally prohibitive, but the cost associated with the down time of the facility associated with such a replacement is generally even more expensive than the actual costs of replacing the pipe. For this reason, replacement of the entire pipe is generally not a viable option.

The second method currently employed for addressing this problem is to install a slip lining within the pipe. Using a slip lining, folded form liner, or sock liner reduces the interior diameter of the pipe and as the pipe grows in size, becomes increasingly difficult to handle.

Employing a CIPP lining may be an acceptable technical solution, but the costs are very high and, for pressure pipe, the technology is limited to pipes about 42 inches in diameter.

Lining a pipe with carbon cloth can work, but installation is extremely labor intensive, slow, costly, and wasteful of materials. To install carbon cloth to the interior surface of a pipe, the interior of the pipe is first hydro-blasted and then workers manually mix and trowel or roll the epoxy mortar that is used as the adhesive onto the interior surface of the pipe. Then the workers apply sections of carbon cloth to the interior surface, similar to the way wallpaper is hung on a wall of a building. The carbon cloth must be rolled out by hand with a great deal of effort to ensure that all of the carbon fibers are wetted. Also, the size of the cloth pieces that may be applied is limited because of the weight and handling considerations. Limiting the size of the cloth pieces limits the effectiveness of what should be a continuous fiber lining.

One problem inherent in lining a pipe with carbon cloth by this method is that any epoxy mixture that is not used in a short period of time must be discarded. Another problem is that a large amount of the epoxy drips off of the interior surface during the application of the carbon cloth, creating additional waste and creating messy and difficult working conditions for the workers. Also, when the carbon cloth is wet, it becomes very heavy and as the epoxy loses its thixotropic properties or viscosity as temperatures change or it cures, it is likely that some of the carbon cloth will fall off of the interior surface.

The present invention addresses these problems by providing a structural lining system for application to the interior surface of a pipe and a method for applying the structural lining. First hydro blasting cleans the interior of the pipe. Next, a layer of adhesive is sprayed onto the interior of the pipe. The, strips of previously coiled unidirectional carbon fiber material are applied to the interior of the pipe by allowing the strips to uncoil against the interior of the pipe so that side edges of the strips abut the side edges of adjacent strips. If ends of the strips overlap, additional adhesive, either the same or a different type of adhesive than that used on the interior surface, is applied between the overlapping portions of the ends. Finally, a spray on coating is applied over the strips. This coating forms and internal liner that protects the unidirectional carbon fiber material from abrasion, provides a very low friction monolithic liner, and is light in color to allow for easy visual inspections in the future.

The present invention does not waste materials, and it does not create a messy work environment for the installation workers. The present invention is easy to apply, even to large diameter pipes, employing only a relatively small number of installation workers. The present invention can be installed quickly and at relatively low cost. The present invention increases the tensile strength of the pipe without a significant decrease in the interior diameter of the pipe. Finally, the present invention provides a permanent solution to the problem.

SUMMARY OF THE INVENTION

The present invention is a structural lining system for application to the interior surface of a pipe and a method for applying the structural lining. The structural lining is applied to the interior of a pipe by first cleaning the interior of the pipe by hydro blasting. Next, a layer of adhesive is sprayed onto the interior of the pipe to form an adhesive layer. Although a number of adhesives might function, a moisture-insensitive, 100% solids epoxy functions best because of its superb strength and excellent adhesive qualities. It can also be made thixotropic to permit an adhesive layer thick enough to compensate for minor irregularities in the pipe. On smooth pipe, an epoxy layer of 0.5 mm to 1.0 mm might be typical.

Then, strips of previously coiled unidirectional carbon fiber material are applied to the interior of the pipe by allowing the strips to uncoil. Unidirectional carbon fiber fabric may be obtained as CARBOLAM HR available from Epsilon Composite, 5, Route de Hourtin, 33340 Gaillan, France.

The strips uncoil on their own in an attempt to return to a flat configuration, against the curved interior of the pipe so that side edges of the strips abut the side edges of adjacent strips. It may be desirable to overlap the two ends of each of the strips to provide additional strength to the pipe. If ends of the strips are to be overlapped, additional adhesive, either of the same or of a different type than the adhesive used on the interior surface, is applied between the overlapping portions of the ends.

Finally, a spray on coating, preferably an epoxy coating, is applied over the strips. This final coating forms an internal liner that protects the unidirectional carbon fiber material from abrasion, provides a monolithic liner with very low friction, and is light in color to allow for easy visual inspections in the future.

DETAILED DESCRIPTION OF THE PREFERRED EMBODIMENT

Invention

Figure 1:
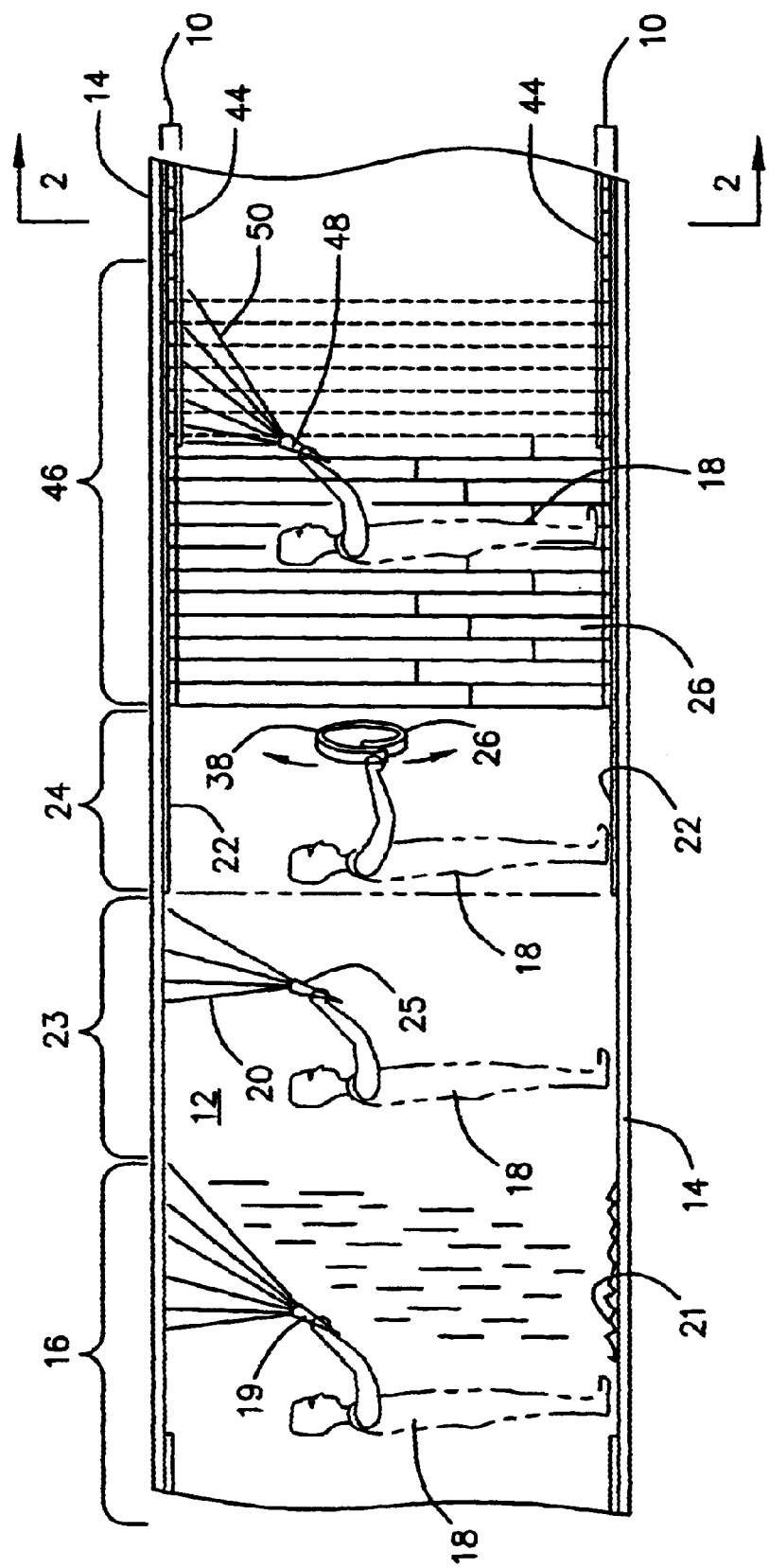
FIG. 1 is a diagram showing the steps for applying a structural lining system for a pipe in accordance with a preferred method of the present invention.

Referring now to drawings and initially to FIG. 1, there is illustrated a structural lining 10 for application to an interior surface 12 of a pipe 14 and a method for applying the structural lining 10. The interior surface 12 of the pipe 14 is first cleaned. Hydro blasting is an effective and efficient way to accomplish the cleaning on concrete pipe 14. Hydro blasting with a minimum of 4,000 p.s.i. pressure and a rotating head is normally required to remove loose and latent concrete, dirt, oil, etc. from the interior of a concrete pipe 14. In some cases, higher pressure, detergents, steam, solvents, or abrasives might be required. This first step is illustrated in FIG. 1 in association with the numeral 16 where a workman 18 is employing a hydro blasting machine 19 to clean debris 21 from the interior surface 12 of the pipe 14. Obviously, the interior surface 12 of the pipe 14 may be cleaned by means other than hydro blasting. Hydro-blasting is an acceptable way to clean structures made of concrete, brick or tile, but sandblasting, grinding, wire brushing or other mechanical means are preferred for structures made of steel or when applying the structural lining 10 over other existing polymeric linings.

Next, an adhesive 20 is sprayed onto the interior surface 12 of the pipe 14 to form an adhesive layer 22. This step is illustrated in FIG. 1 in association with numeral 23. FIG. 1 shows a workman 18 spraying the adhesive 20 onto the interior surface 12 by means of a sprayer 25. The adhesive 20 is selected based on the pipe requirements, but epoxies have been found to be effective in this application. The normal thickness of the adhesive layer 22 is approximately 0.5 to 1.0 mm, but a thickness up to approximately 7.5 mm might be desirable in some applications.

The composition of one epoxy that has been show to be useful as the adhesive 20 has the following approximate composition, by weight, for the resin and the hardener:

| COMPONENT | PERCENTAGE BY WEIGHT |
|---|---|
| RESIN COMPOSITION | |
| Shell Epi-Rez (Bis-A) 828 | 71.9 |
| Shell Epi-Rez 8111 | 5.7 |
| Shell Epi-Rez (Bis-F) 862 | 10.3 |
| Shell Epi-Rez 8132 | 6.6 |
| Aerosil 202 (fumed silica) | 3.25 |
| Blue pigment | 0.25 |
| Dow Corning DC-200 air release | 1.00 |
| Dow 57 - flow aid | 1.00 |
| HARDENER COMPOSITION | |
| Shell Epi-Cure 3379 | 38.0 |
| Shell Epi-Cure 3271 | 29.2 |
| Shell Epi-Cure 3277 | 13.9 |
| Shell Epi-Cure 3270 | 4.7 |
| Aerosil 202 (fumed silica) | 7.1 |
| TiO2 (R-900) | 7.1 |

The above-described epoxy is preferably mixed in a blend of 100 grams of resin and 35.1 grams of hardener.

The next step, as denoted by numeral 24 in FIG. 1, involves preparing and applying strips 26 of unidirectional carbon fiber material to the interior surface 12 of the pipe 14. Unidirectional carbon fiber material may be obtained as CARBOLAM HR available from Epsilon Composite, 5, Route de Hourtin, 33340 Gaillan, France.

The adhesive 20 and the binder used in the unidirectional carbon fiber material need to be chemically compatible.

Figure 2:
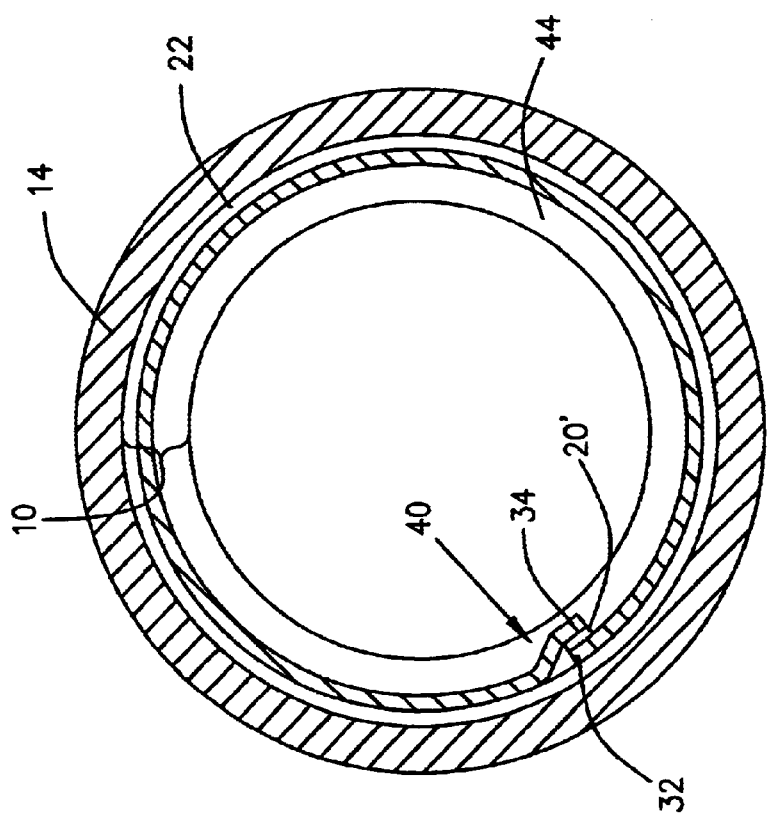
FIG. 2 is a not-to-scale cross sectional view taken along line 2—2 of FIG. 1, drawn to illustrate an overlapping junction of a strip.

The unidirectional carbon fiber material is purchased as flat stock of varying width and thickness, typically 80–150 mm wide and 1.0–1.4 mm thick. This material has extremely high composite strength, up to approximately 350,000 psi, depending on the thickness selected, and has been used in Europe as flat stock to structurally repair bridges. The unidirectional carbon fiber material can be designed based on the selection of raw materials and the method of manufacture to optimize strength, flexibility and cost. This flat stock is made into strips 26 so that each strip 26 is approximately 2 to 8 inches wide, measured between its two side edges 28 and 30, and so that each strip 26 is at least as long, as measured between its two ends 32 and 34, as the internal circumference of the pipe 14. Strips 26 having widths as great as 12 inches may be possible with this material. In many applications, it may be desirable to have the strips 26 cut so that each strip 26 is longer between its two ends 32 and 34 than the internal circumference of the pipe 14 so when the strips 26 are installed on the interior surface 12 of the pipe 14, the ends 32 and 34 will overlap each other, as illustrated in FIG. 2. Whether the ends 32 and 34 are to overlap or just abut each other when they are installed will be determined by the strength and pressure requirements of the pipe 14.

Once the strips 26 have been cut to the proper width and length, each strip 26 is rolled into a coil 38, as illustrated in FIG. 1. The strips 26 may be rolled into coils 38 either prior to placing them inside the pipe 14, or if there is not sufficient space to permit the coils 38 to be placed into the pipe 14, the strips 26 may be place within the pipe 14 before they are rolled into coils 38.

Once the strips 26 are thus rolled up into coils 38, the strips 26 must be held or bound in some way to prevent the strips 26 from automatically uncoiling since each strip 26 will be under tension in a fashion similar to the tension that is present in a coiled up main spring in a mechanical watch. When the tensioned coils 38 are released inside the pipe 14 by the workman 18, the strips 26 will try to straighten out and try to go back to a flat configuration. This tendency to uncoil causes each of the strips 26 to press itself firmly against the adhesive layer 22 that was previously applied to the interior surface 12 of the pipe 14 and allows the adhesive 20 to set without the danger of the strips 26 falling off the interior surface 12.

For pressure service, adhesion to the interior surface 12 is not absolutely required, but for external loads, it is needed so that the structural lining 10 forms a composite structure with the pipe 14. Also, the more outward force the strips 26 exert on the interior surface 12, due to their spring action, the more tightly the strips 26 are held in place against the interior surface 12, even absent the adhesion of the adhesive layer 22.

Figure 4:
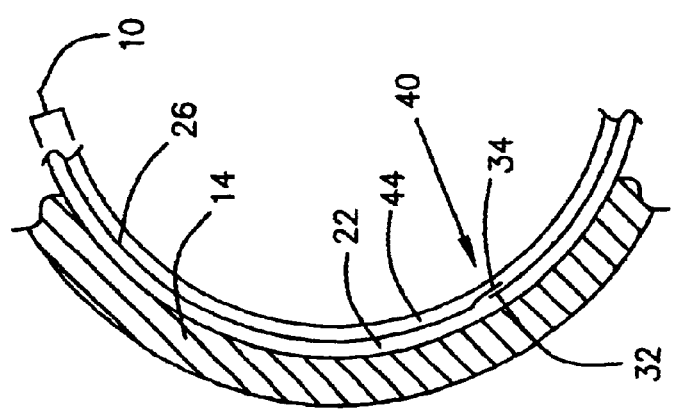
FIG. 4 is an enlarged partial view of the pipe similar to that illustrated in FIG. 3 only showing details of a junction where the ends abut and do not overlap.

When releasing the coils 38, the workman 18 with position the coil 38 so that as the strip 26 uncoils, one of its side edges 28 or 30 abuts a previously uncoiled adjacent strip 26 and a junction 40, that is formed where the ends 32 and 34 meet or overlap, is staggered from a junction 40 of the adjacent strip 26. FIG. 4 shows the arrangement when the ends 32 and 34 meet and do not overlap to form the junction 40, and FIG. 2 shows the arrangement when the ends 32 and 34 overlap to form the junction 40. It is preferred that the junctions 40 be staggered so that each junction 40 is located within the pipe 14 at approximately 120 degrees from the junctions 40 of the two strips 26 adjacent to it.

Figure 3:
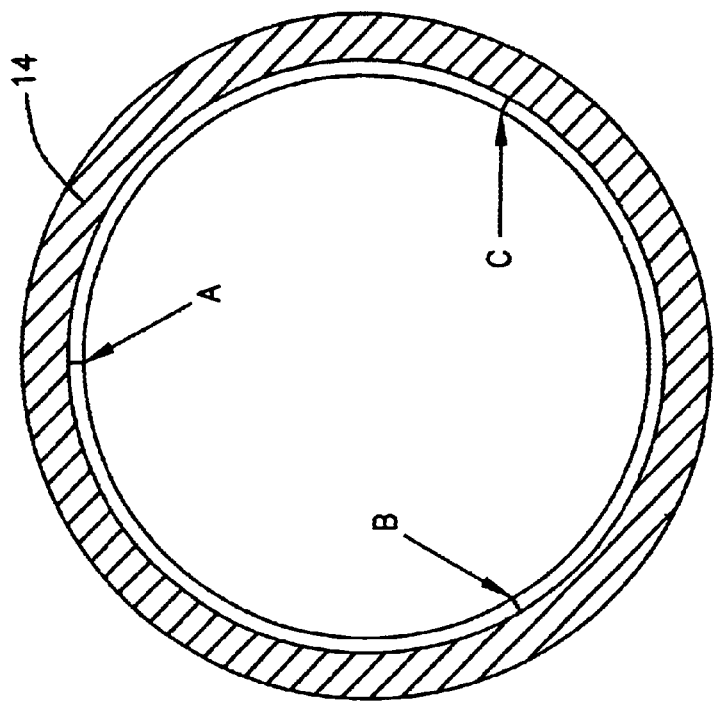
FIG. 3 is a cross sectional view of FIG. 2, drawn to proper scale.
Figure 5:
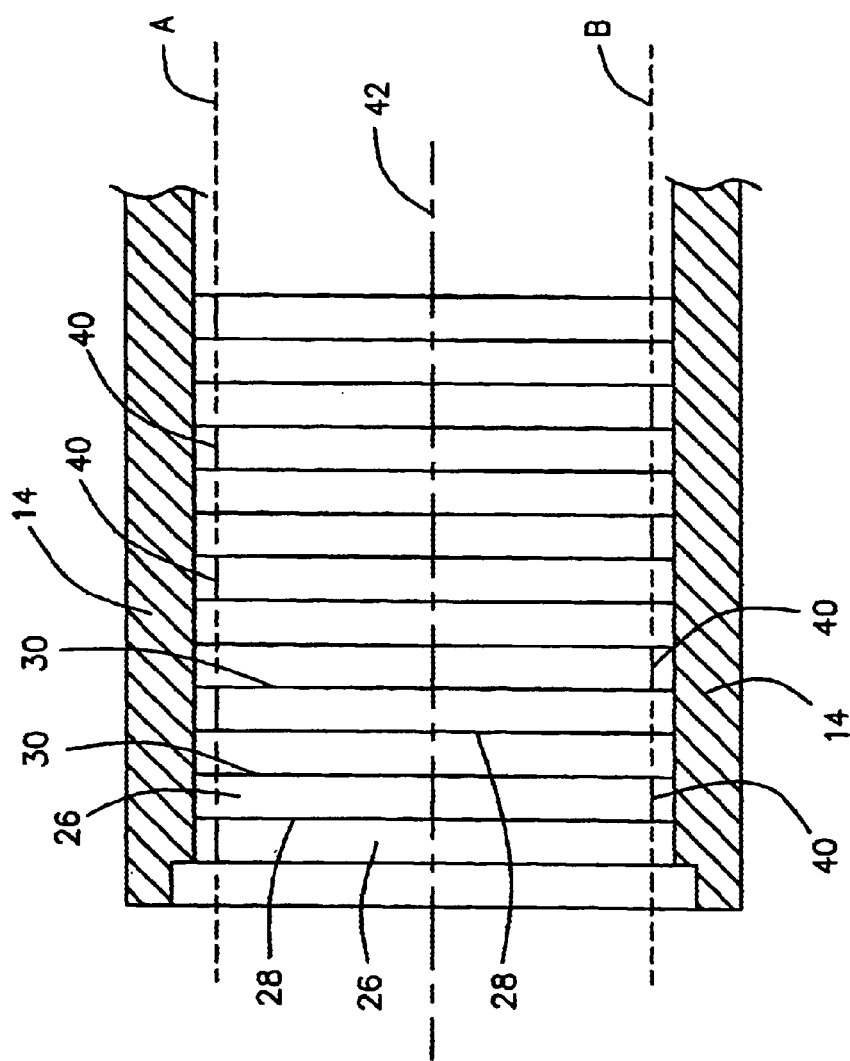
FIG. 5 is an enlarged view of the pipe of FIG. 1, shown after the strips have been applied but before the final epoxy layer has been applied, showing staggered junctions.

This 120-degree arrangement of junctions 40 is illustrated in FIG. 3 and FIG. 5, by points A, B, and C. Thus if a first strip 26 has a junction 40 located at point A, then a second adjacent strip 26 should have its junction 40 at either point B or point C, and a third strip 26 that is located adjacent to the second strip 26 should have its junction 40 at point C if the junction 40 for the second strip 26 was at point B, or alternately, should have its junction 40 at point B if the junction 40 for the second strip 26 was at point C. Subsequent strips 26 would repeat this sequence for the location for their junctions 40 so that the junctions 40 of adjacent strips 26 do not align parallel to a longitudinal axis 42 of the pipe 14.

If the ends 32 and 34 are to be overlapped, additional adhesive 20' is manually applied between the overlapping portions of the ends 32 and 34 by first pulling the end 34 away from the end 32, applying the adhesive 20 with a brush (not illustrated) or other suitable applicator, and then allowing the end 34 to recoil back against its associated end 32. The additional adhesive 20' may be an epoxy such as the type used in the adhesive layer 22 or may be a glue such as an ethyl or methyl cyanoacrylate monomer. Alternately, an acrylated epoxy resin may be used as the additional adhesive 20' in order to speed up set time. Ethyl or methyl cyanoacrylate monomers have been found to work effectively in certain applications as the additional adhesive 20'. The additional adhesive 20' should be selected based on the needs of the particular application.

A final interior coating 44, preferably a light colored epoxy, is applied over the strips 26. The coating 44 may be of the same material as used in the adhesive layer 20. One product that may be used as the coating 44 is CITADEL NR 2000, available from Citadel Technologies, Inc., 1927 South Boston, Suite 206, Tulsa, Okla. 74119. Again, the specific material that is selected for the coating 44 will be chosen based on the needs of the particular application. This step is illustrated in FIG. 1 in association with numeral 46. As illustrated, a workman 18 employs a spray apparatus 48 to spray a coating material 50 onto the strips 26 to form the interior coating 44. This interior coating 44 forms a monolithic liner that protects the strips 26 of unidirectional carbon fiber material from abrasion, that is very low friction, and that is light in color to allow for easy visual inspections in the future.

While the invention has been described in association with the repair of a pipe 14, the invention is not so limited. The present invention may be employed with tanks or with any other curved surfaces, including, but not limited to round or oval structures. The present invention may be adapted for use with structures of other shapes.

Unidirectional Carbon Fiber Material

The present invention is an improvement over prior art methods and products for reinforcing a pipe in that this invention employs factory manufactured and cured unidirectional carbon fiber material to line the interior of a pipe or tank. No one else has ever successfully been able to use this material to line a curved surface. This is true despite the highly desirable strength and durability of the material. Factory manufactured and cured unidirectional carbon fiber material is a thin sheet material that is extremely strong. For example the tensile strength of this unidirectional material is in the range of 275,000–427,000 psi. This tensile strength approaches the tensile strength of carbon fiber at approximately 550,000–700,000 psi. The material is strong because of the unidirectional alignment of the carbon fibers from which the material is manufactured. Because it is factory manufactured, the material is more uniform in composition and thickness. This means that the fibers are thoroughly wetted with epoxy during the manufacturing process and the material is properly cured to maximize its strength. Because it is factory cured, the material achieves maximum strength for carbon material within minimum thickness of the material. Also, the thickness of the material is held within close tolerance because it is manufactured in a factory. Field constructed materials or laminates of carbon can not approach the strength per thickness of this material because of a lower total percentage of carbon in the field constructed materials and the difficulty in adequately wetting out the materials with binding epoxy when the materials are constructed in the field.

The present invention uses the stiffness of manufactured epoxy-carbon strips by capturing the potential energy of these coiled up carbon strips so that when the coil is released, the potential energy is converted to making the carbon strip conform to the curved surface. When the force that is holding the material in a hoop is released, the strip will immediately attempt to spring back to a flat configuration.

This tendency to resume a flat configuration has in the past made the material virtually impossible to apply to the exterior of a curved surface, such as the curved outside surface of a pipe or tank, since the material will pull itself away from the surface to which it is to be applied. This stiffness of the material has, until now, also made application of the material to the curved interior surface of pipes or tanks virtually impossible. The material is stiff, making it difficult to carry into pipes in a flat configuration, and its tendency to maintain or resume a flat configuration if bent has made application to a curved interior surface impractical.

However, the present invention employs this tendency to resume a flat configuration to aid in applying the material to the interior of a pipe. The material must be cut into strips to facilitate handling the material in a rolled up configuration within the pipe to be lined. Once the coiled material is properly position, i.e. the side edge of the coiled strip abutting the side edge of the previously applied strip, the coiled strip is allowed to unfurl and it presses itself against the interior of the pipe.

Use of unidirectional carbon fiber material makes this invention viable since the material is so strong in relationship to its thickness. Often other lining systems are not intended as pressure barriers. Other materials used as liners have tensile strength as low as 3,000 psi and would need to be several inches thick or over 100 times thicker than the material used in the present invention to provide the same pressure barrier. For example, the next strongest carbon material is bidirectional woven carbon fabric which has a tensile strength that is approximately ⅓ to ¼ the tensile strength of unidirectional carbon fiber material. Although bidirectional woven carbon fabric is much more flexible and therefore much easier to apply to curved surfaces, it also requires a much thicker application to achieve the desired strength that can be achieved with a very thin layer of unidirectional carbon fiber material. For example, to achieve the same strength as a 1 mm thick single layer of unidirectional carbon fiber material, it would be necessary to apply a layer of woven carbon fabric that is 4 to 8 mm thick. Theoretically only twice as much fabric might be needed, but due to poorer control and repeatability, a greater safety factor must be used. A layer this thick on the interior of a pipe would be impractical because it would greatly reduce the internal diameter of the pipe, thus restricting the flow capacity of the pipe. Also, it is difficult to apply wetted cloth to the interior of a pipe as the weight of the wetted cloth itself will cause it to fall off, causing poor quality product.

The problem faced in using unidirectional carbon fiber material is that the material is flat and relatively inflexible and therefore hard to apply to a curved surface. The present invention has overcome this problem and found a way to use the unidirectional carbon fiber material to conform to the interior of a pipe or tank. No one else has ever been able to achieve this due to the stiffness of the material and its tendency to resume its flat configuration.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A structural lining system for lining an interior surface of a hollow cylindrical structure comprising:
    a hollow structure having an interior surface, an adhesive layer applied to said interior surface, and
    strips of flat stock of factory manufactured and cured unidirectional carbon fiber material approximately 0.5–1.4 mm thick and approximately 2–12 inches wide, each said strip secured circumpherentially to the interior surface of the hollow structure via the adhesive layer, side edges of each strip abutting side edges of adjacent strips, and opposite ends of each of the strips joined at a junction to form a single layer of circumpherentially disposed hoops of strips lining the interior surface of the hollow structures, wherein the tensile strength of the unidirectional carbon fiber material is at least 275,000 psi.

2. A structural lining system according to claim 1 wherein said adhesive layer is an epoxy.

3. A structural lining system according to claim 1 further comprising:
    an additional adhesive layer applied between overlapping ends of each of the strips at the junctions.

4. A structural lining system according to claim 3 wherein said additional adhesive layer is an epoxy.

5. A structural lining system according to claim 3 further comprising:
    an interior coating applied over the interior surface of the strips.

6. A structural lining system according to claim 5 wherein said interior coating is an epoxy.

7. A structural lining system according to claim 5 wherein said adhesive layer, said additional adhesive layer and said interior coating is each an epoxy.

8. A structural lining system according to claim 3 wherein the junctions of adjacent strips are staggered so that adjacent junctions do not align longitudinally.

* * * * *